June 17, 1924.  
A. L. DUNCAN  
PEACH PITTING APPARATUS  
Filed Feb. 4, 1924

Inventor.  
Arthur L. Duncan,  
By Cleven & Totten  
attorneys.

June 17, 1924.

A. L. DUNCAN

PEACH PITTING APPARATUS

Filed Feb. 4, 1924

Inventor.
Arthur L. Duncan
By Geier & Totten
Attorneys.

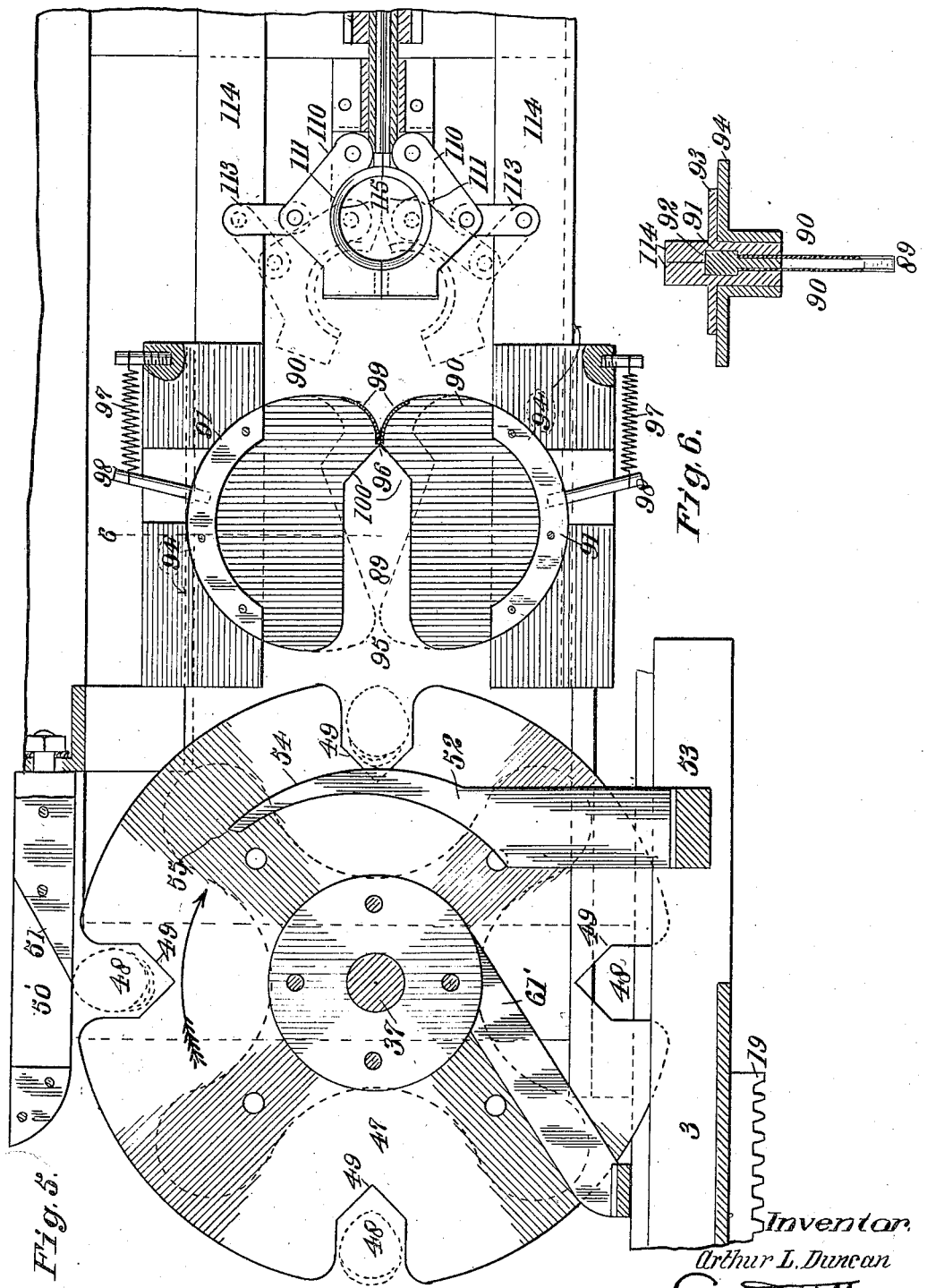

June 17, 1924.
A. L. DUNCAN
PEACH PITTING APPARATUS
Filed Feb. 4, 1924
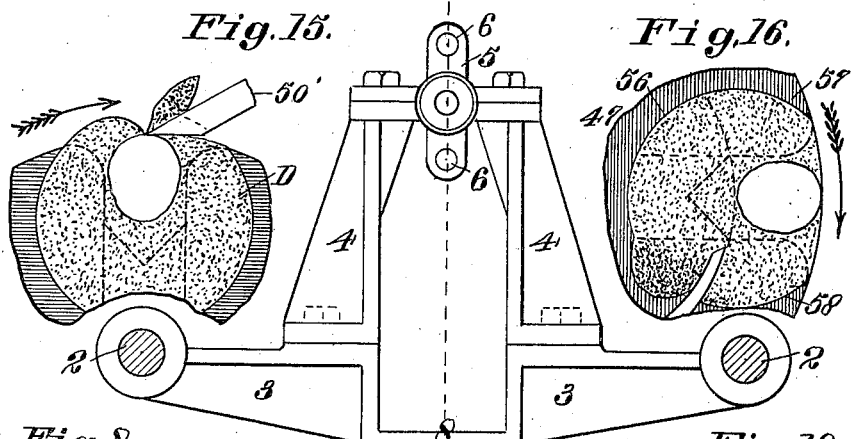
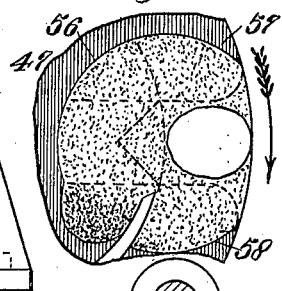
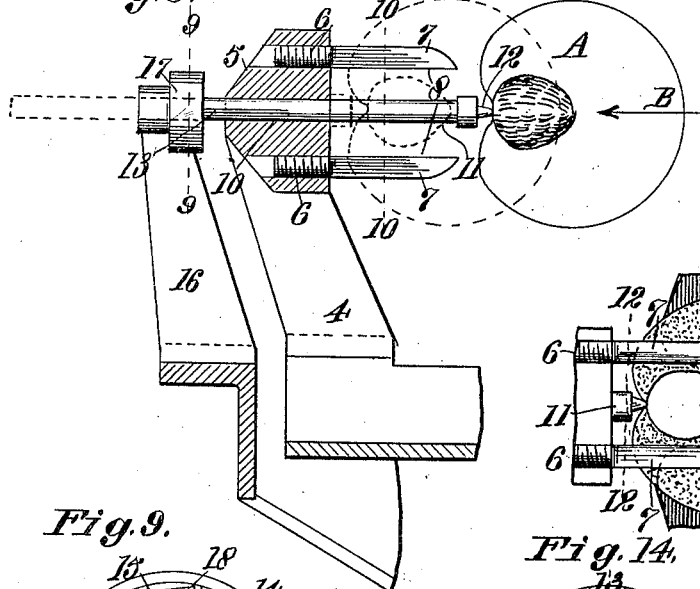
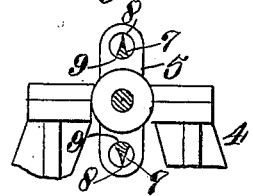
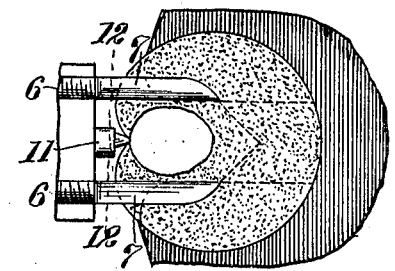
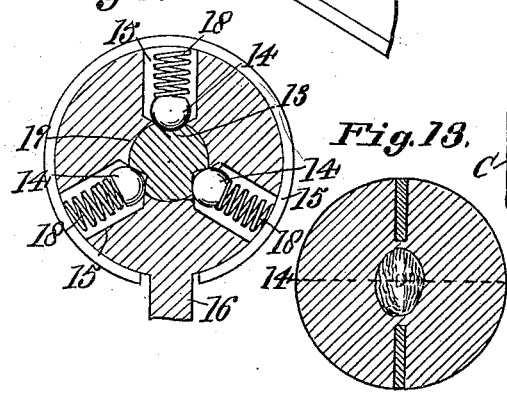
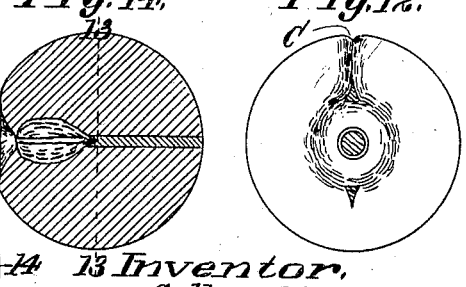
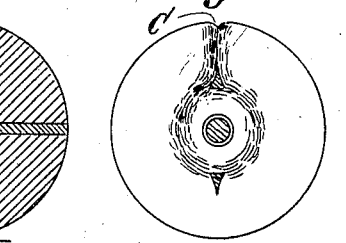

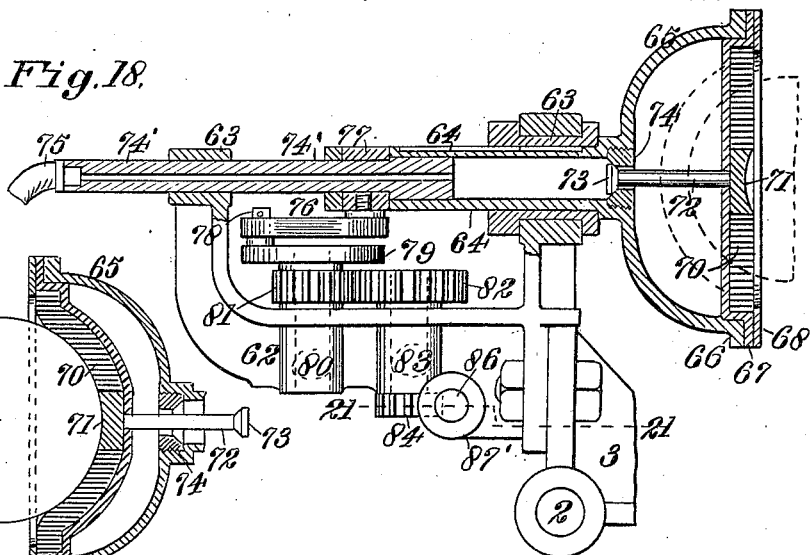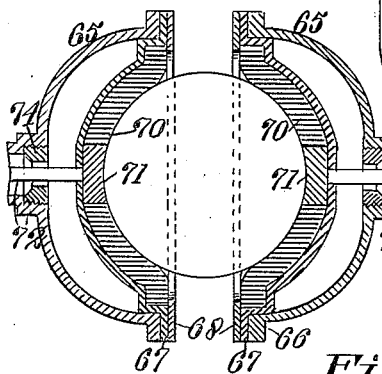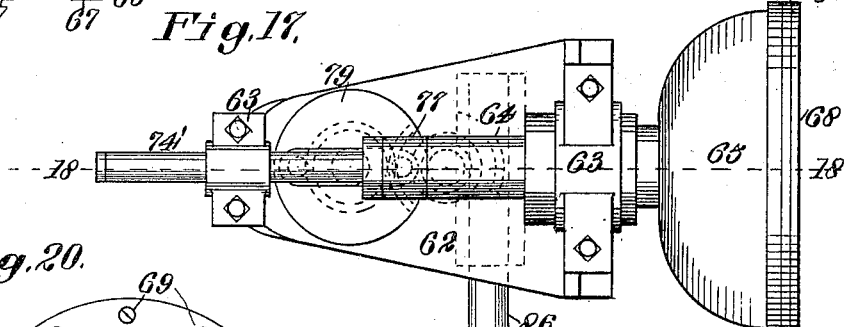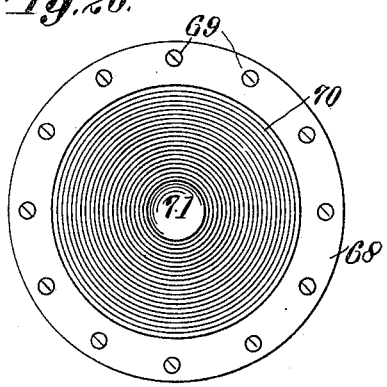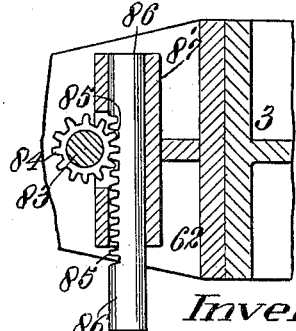

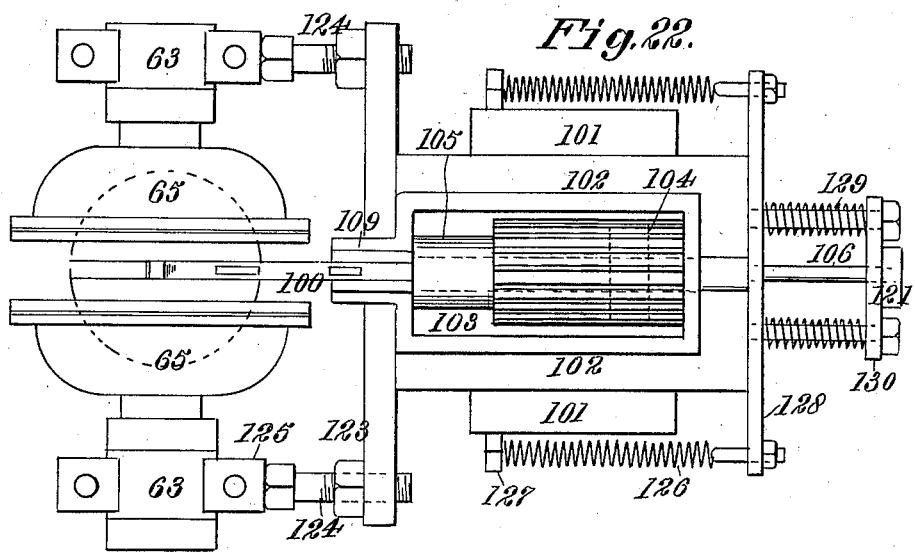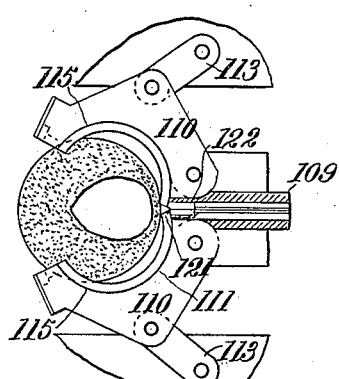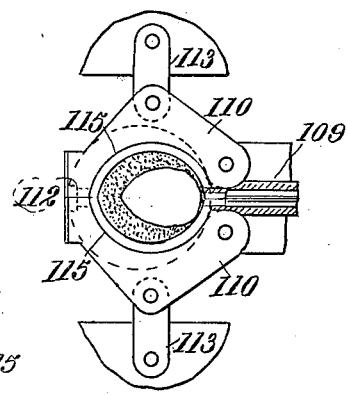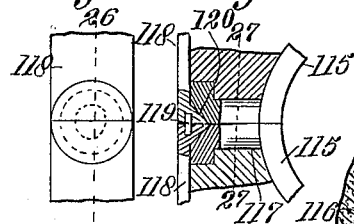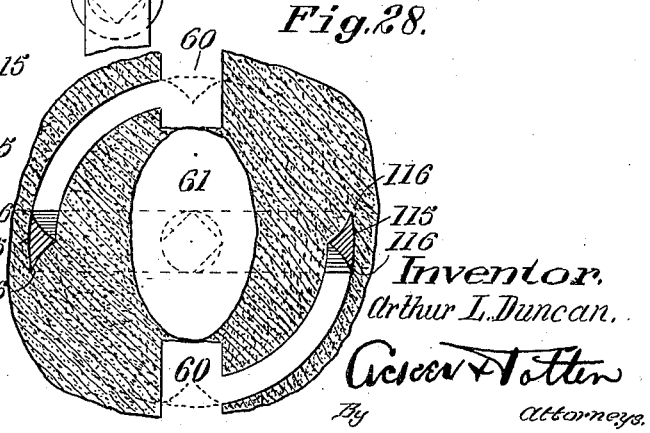

June 17, 1924.
A. L. DUNCAN
PEACH PITTING APPARATUS
Filed Feb. 4, 1924
1,498,078
9 Sheets-Sheet 8
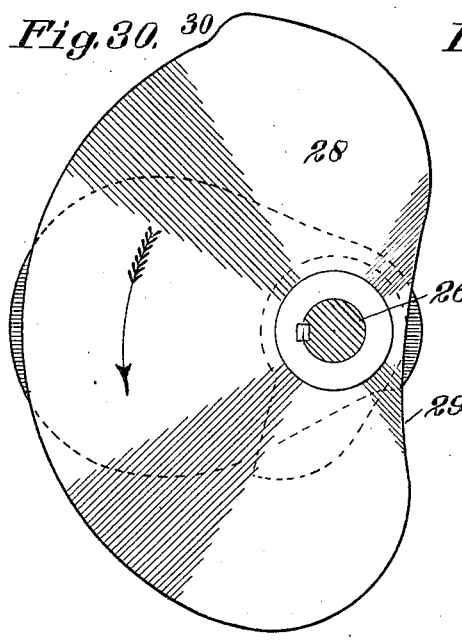
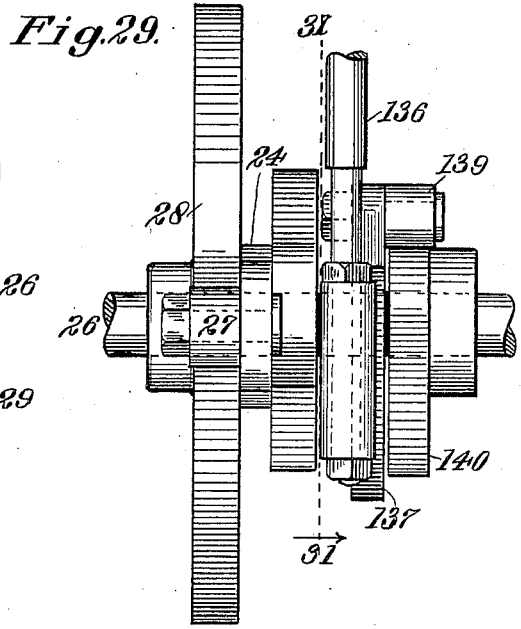
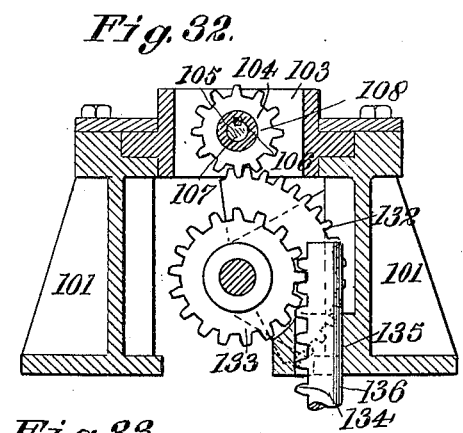
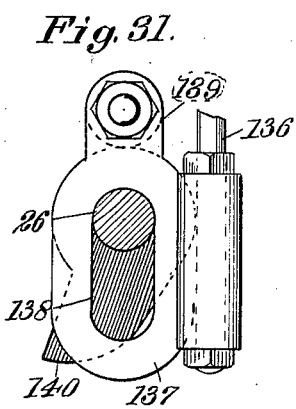
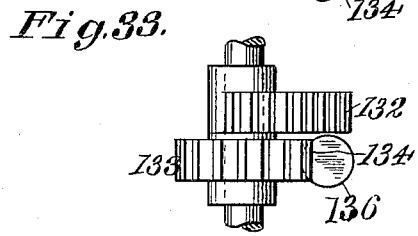
Inventor.
Arthur L. Duncan.
Attorneys.

June 17, 1924.

A. L. DUNCAN 1,498,078

PEACH PITTING APPARATUS

Filed Feb. 4, 1924

Inventor.
Arthur L. Duncan.
By *(signature)*
Attorneys

Patented June 17, 1924.

1,498,078

UNITED STATES PATENT OFFICE.

ARTHUR L. DUNCAN, OF OAKLAND, CALIFORNIA.

PEACH-PITTING APPARATUS.

REISSUED

Application filed February 4, 1924. Serial No. 690,416.

*To all whom it may concern:*

Be it known that I, ARTHUR L. DUNCAN, a citizen of the United States, residing at Oakland, in the county of Alameda and State of California, have invented certain new and useful Improvements in Peach-Pitting Apparatus, of which the following is a specification.

This invention relates to an apparatus for cutting a fruit, particularly a peach, into sections, preferably halves, and for the removing of the pit therefrom.

The object of the invention is to provide an apparatus capable of uniformly cutting the fruit into sections so that the cut edges will present smooth even surfaces and to cut the pit therefrom and present a smooth even pulp body in the cavity occupied by the removed pit; provide a mechanically operated apparatus capable of operating on a greater number of fruits within a given time than is possible within the same time to be accomplished by the hand method, and thereby increasing production and reducing the cost of halving and pitting the fruit.

The invention consists primarily, first, in a centering or impaling device to receive the fruit to properly present it to cutting and transfer members; secondly, to provide a cutting and transfer member which in cooperation with other means conveys the fruit into operative relation with cutter members so that an annular slice to the depth of the pit is removed from the fruit; third, to provide engaging cup members for removing the fruit from the conveying member and so constructed as to conform to the configuration of the fruit without in any manner pinching or injuring the surface thereof; fourth, to provide a mechanism for removing the pulp adhering to the pit at the base of the annular groove and lastly, to provide a pit removing knife designed for reception within the annular groove and for movement axially of the pit to cut the same from the fruit body.

With the above-mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawing disclosing one embodiment thereof, wherein—

Fig. 5 is an enlarged detailed sectional view taken on the line 5—5, Fig. 2.

Fig. 6 is a sectional view on line 6—6, Fig. 5, of one of the pit groove scrapers.

Fig. 7 is a view in front elevation of the impaling device.

Fig. 8 is a vertical sectional view taken on the line 8—8 of Fig. 7.

Fig. 9 is a sectional view taken on the line 9—9 of Fig. 8 illustrating the friction devices for the centering plunger.

Fig. 10 is a sectional view on line 10—10 of Fig. 8 illustrating the particular formation of the impaling knives.

Fig. 11 is a vertical sectional view through a peach mounted and centered on the impaling knives.

Fig. 12 is a sectional view on line 12—12 of Fig. 11.

Fig. 13 is a vertical sectional view through a fruit illustrating the cuts formed by the transfer member.

Fig. 14 is a sectional view on lines 14—14 of Fig. 13.

Fig. 15 is a sectional view of the fruit as conveyed by the transfer member, illustrating one of cutter knives cutting a portion of the annular groove at the stem end of the fruit and removing a portion of the material therefrom.

Fig. 16 is a view of the same fruit cut as indicated in Fig. 15 and illustrating another of the cutting knives about to remove that portion of the slice from the opposite end of the fruit and which slice was cut by the cutting walls of the transfer member.

Fig. 17 is a view in detailed plan of one of the conveying cups.

Fig. 18 is a longitudinal sectional view on line 18—18 of Fig. 17 illustrating the details of construction of one of the conveying cups.

Fig. 19 is a vertical sectional view through the pair of conveying cups illustrating the same in the act of holding a fruit.

Fig. 20 is a view in front elevation of one of the conveying cups.

Fig. 21 is a sectional view on line 21—21 of Fig. 18.

Fig. 22 is a detailed sectional view of the supporting frame and mounting for the pit removing knives.

Fig. 23 is a view in detailed elevation, partly in section, of the pit removing knives and their mounting about to embrace a pit and be received in the groove formed by the removed slice.

Fig. 24 is a view similar to Fig. 23 with the pit removing knives received in a groove.

Fig. 25 is a view in end elevation of the knife mounting frame illustrating in dotted lines the bearing for the pit-removing knives.

Fig. 26 is a vertical sectional view on line 26—26 of Fig. 25.

Fig. 27 is a sectional view on line 27—27, Fig. 26, viewed in the direction of the arrows.

Fig. 28 is a view through a fruit with the knives in operation during the removal of the pit therefrom and illustrating particularly the annular groove formed in the fruit by the removal of the slice.

Fig. 29 is a view in detailed elevation of the operating mechanism mounted on the drive shaft.

Fig. 30 is a view in side elevation of the cam elements illustrated in Fig. 29.

Fig. 31 is a vertical sectional view on line 31—31, Fig. 29, viewed in the direction of the arrow.

Fig. 32 is a view in detail of the mechanism for imparting oscillatory movement to the pit removing knives.

Fig. 33 is a view in top plan of the main shaft illustrated in Fig. 32 showing the segmental gear carried thereby.

Figure 37:
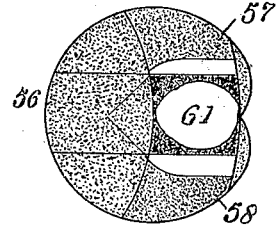

Fig. 37 is a similar view of the fruit in another stage of its operation, illustrating the recesses made by the withdrawing of the impaling knives, and the portion of the slice cut from the blossom end of the fruit relieving the side portions of the slice upon each outer edge of the impaling devices, the darkened area surounding the pit being the only portion of the slice adhering to the pit and pulp.

Figure 38:
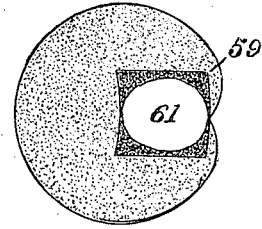

Fig. 38 is a similar view of the fruit illustrating all portions of the slice being removed, the darkened portion being that portion adhering to the pit.

Figure 39:
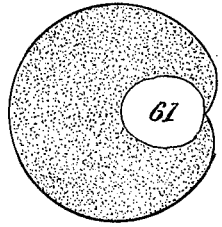

Fig. 39 is a similar view of the fruit with the adhering portion cleaned from the pit.

Figure 40:
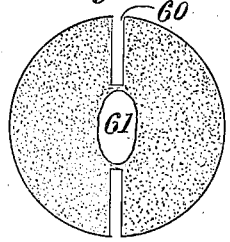

Fig. 40 is a view in end elevation of the fruit illustrating the annular groove formed by the removal of the slice.

Figure 41:
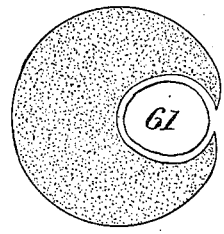
Figure 42:
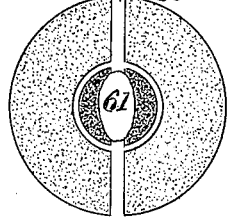

Fig. 41 is a similar view of the fruit illustrating the path formed by the cutting knives in their movement circumferentially of the pit and Fig. 42 illustrates the two half slices of fruit separated from the pit.

In the drawings, it is suggested that to more clearly comprehend the construction and operation of the invention, particularly the steps of operation on the fruit, that attention be directed during the reading of this specification to Figs. 34 to 42 inclusive, of the drawing.

In the drawings, the numeral 1 indicates a substantially rectangular main frame having an open top and in said open top the frame mounts the parallel bed guide rods 2. Slidably mounted on the rods 2 to reciprocate in a horizontal plane from one end of the frame to the other, is a bed 3, partly illustrated in Fig. 2 of the drawings. At its feed end the bed 3 mounts an upstanding frame member 4, Figs. 1, 2, 7 and 8, and in the head 5 thereof are detachably secured, preferably by threaded connection 6, the outwardly projecting parallel spaced impaling knives 7 disposed preferably one above the other in a vertical plane as in Fig. 10, the impaling devices being in the form of knives having their cutting edges 8 outwardly disposed and having relatively broad backs 9 lying opposite each other. Mounted to reciprocate in a guide opening 10 in the head 5 midway between the impaling device 7 is the body 11 carrying on one end a fruit centering pin 12, Fig. 8, designed for reception within the stem depression within the fruit as illustrated in Figs. 8 and 11. The body 11 is of sufficient length as to extend beyond opposite faces of the head 5 and the same within its length is longitudinally grooved as at 13, Fig. 9, to receive the friction ball members 14, one of which is disposed in the base of each of the bores 15 arranged radially within the upper end of a stationary arm 16 carried at the end of the main frame 1 directly in rear of the head 5. The upper end of the arm 16 is provided with a bore 17 for receiving the end of the member 11 when the head 5 is moved to fruit receiving position. The body 11 slides freely within the bore 10 but the friction of the balls 14 pressed by the springs 18 against the same causes said body to reciprocate outwardly in the bore 10 on the retraction movement of the frame 3, thus positioning the centering pin 12 in advance of the impaling members 7, Fig. 8, so that the operator can easily center a peach on the centering head. The friction of the ball members 14 is such as to be easily overcome by the strength of the operator in manually moving the peach A in the direction of the arrow B onto the impaling devices 7, Fig. 8, of the drawings. The impaling devices receiving the fruit as indicated in Figs. 8 and 11 pass along opposite side edges of the pit at its point of greatest transverse width and cut the fruit along parallel lines as illustrated in Figs. 11 and 12, the operator having positioned the crease C of the fruit in alignment with the impaling devices. When in this position, the bed 3 is moved longitudinally of the frame 1 by the following mechanism. On its under surface the bed mounts a rack 19, Fig. 1, with which engages a pinion 20 which also engages a rack 21 carried by the frame 1. Through a link 22 the pinion connects with a lever 23 with which is pivotally connected one end of a connecting rod 24. The connecting rod 24 at its opposite end is formed with a guide slot 25 embracing the driven shaft 26 and between its ends the rod 24 mounts on one face rollers 27 and 27', arranged one at each end of the slotted portion 25 of the rod. The cam rollers 27 and 27' are actuated by a cam 28 to impart reciprocating movement to the rod 24 which causes the pinion 20 to impart timed reciprocating movement to the bed 3. The cam 28 has a relatively flat portion 29 positioned so that a slight pause is permitted in the bed. movement when the bed is in the position illustrated in Fig. 1 and the cam is also provided with an abrupt portion 30 so positioned that an increased or sudden movement will be imparted to the bed 3 at such time as the impaling devices are presenting a fruit to the cutting recesses of the transfer member. The driven shaft 26 carries a gear 31, which intermeshes with a driving pinion 32 on a shaft 33 mounting a power pulley 34. The imparting of power to the shaft 33 and its transmission to the driven shaft 26 furnishes operating movement for all of the parts of the present invention.

The main frame 1 at one end mounts a raised frame portion 35 and within the end standards 36 thereof at one end of said raised portion is journalled a shaft 37 mounting the radially slotted member 38 of a Geneva gear. The other or crank pin member of the Geneva gear is carried by a shaft 39 and consists of a crank 40 mounting a pin 41 adapted for engagement in the radial slots 42 of the member 38, said crank mounting a sector 43 adapted for reception within arcuate depressions 44 in the member 38 at such time as it is desired to maintain the shaft 37 from movement. The shaft 39 is operated by a chain or other flexible connection 44' driven from the shaft 26 by a sprocket 45.

Figure 1:
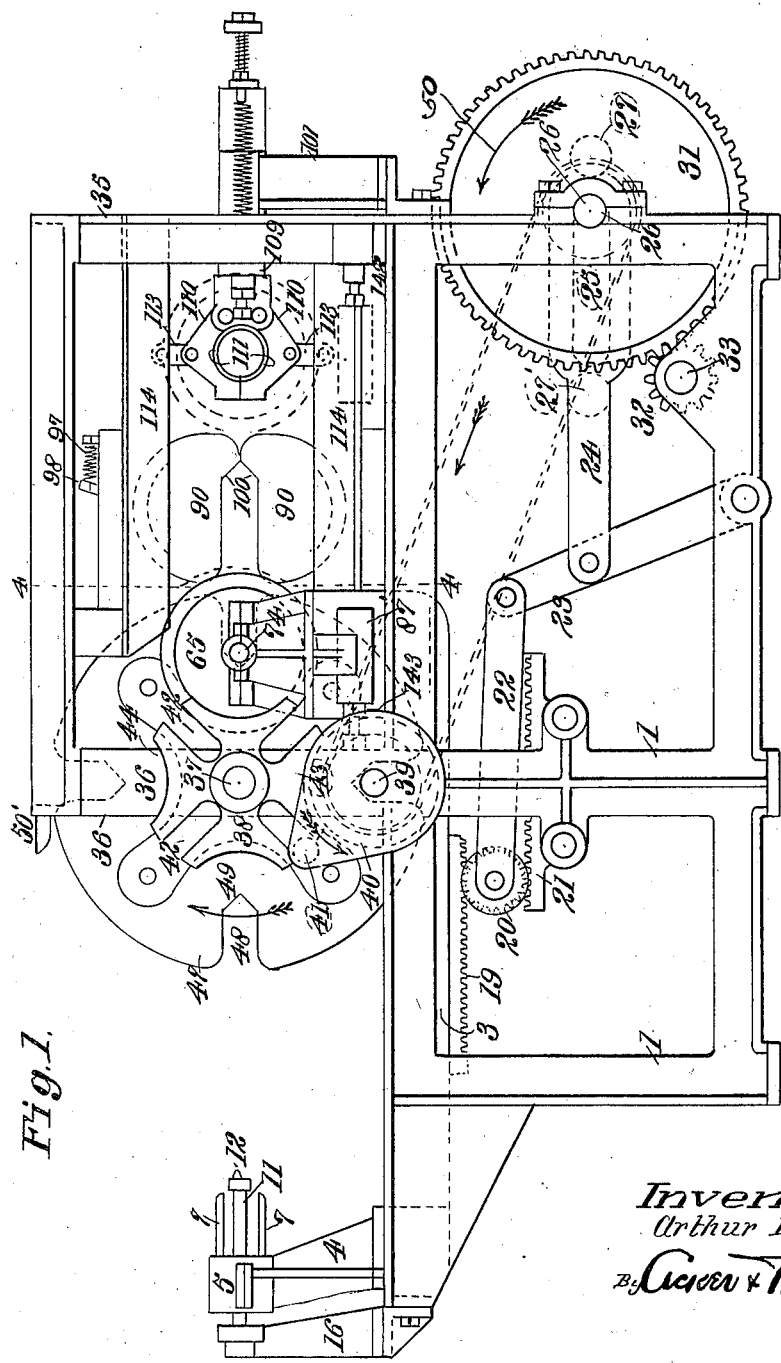
Fig. 1 is a view in side elevation.
Figure 2:
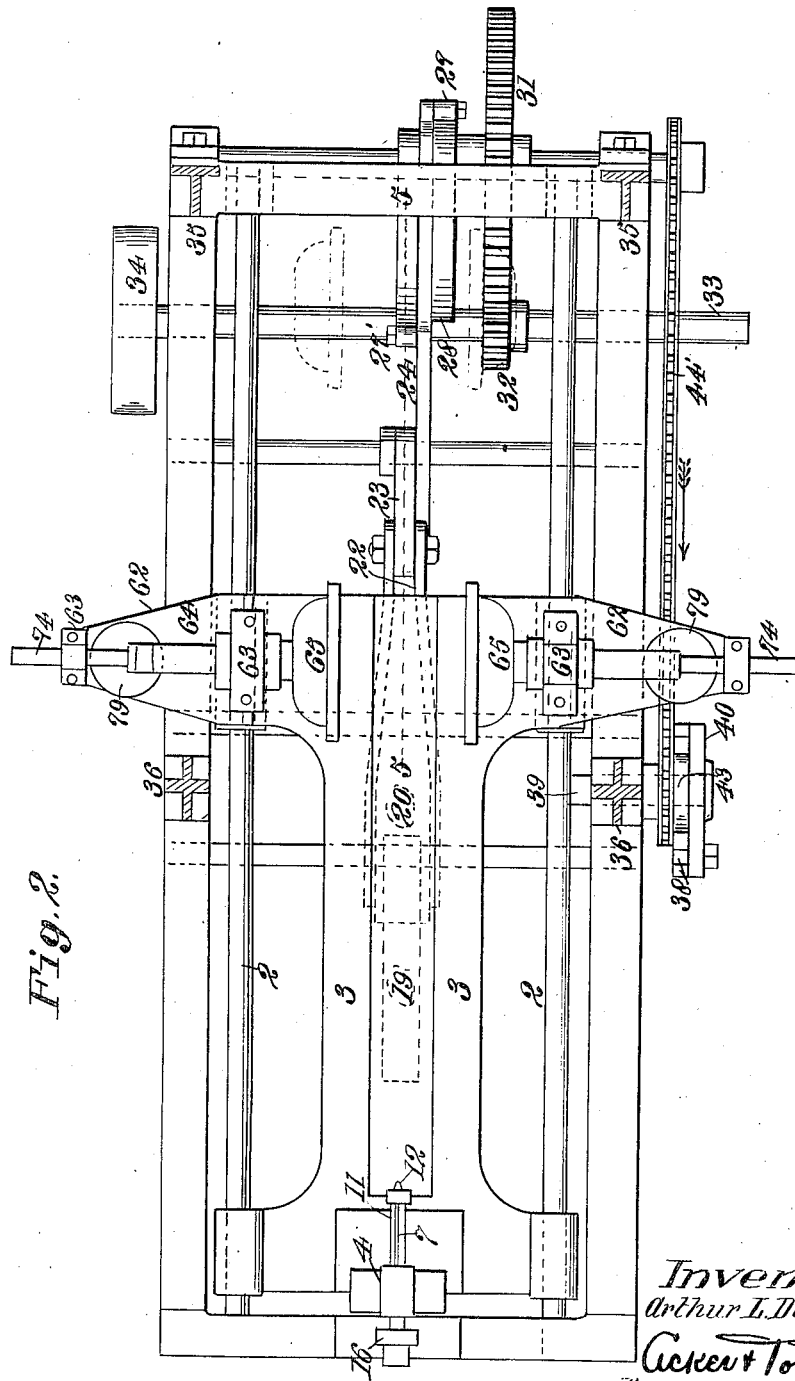
Fig. 2 is a view in top plan with certain of the elements removed to clearly disclose the movable bed.
Figure 3:
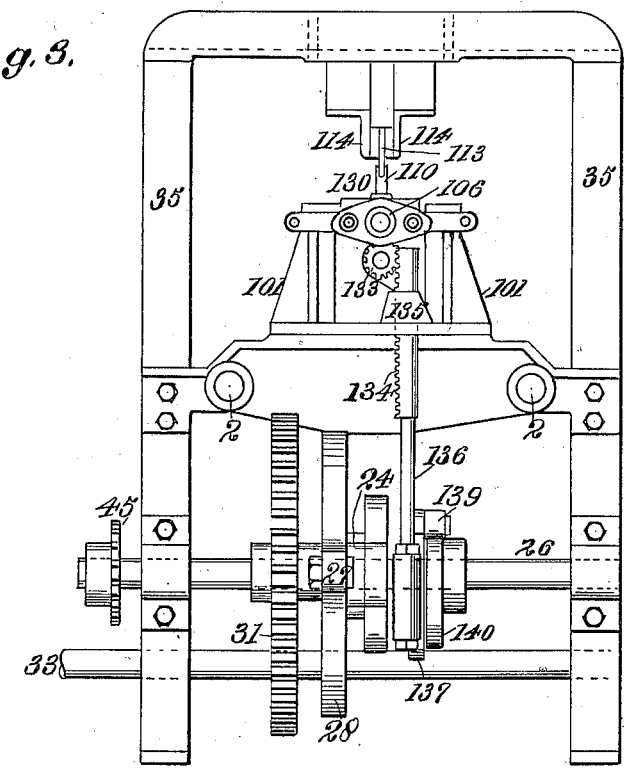
Fig. 3 is a view in end elevation of the structure illustrated in Fig. 1 showing particularly the operating mechanism for the pit removing knife.
Figure 4:
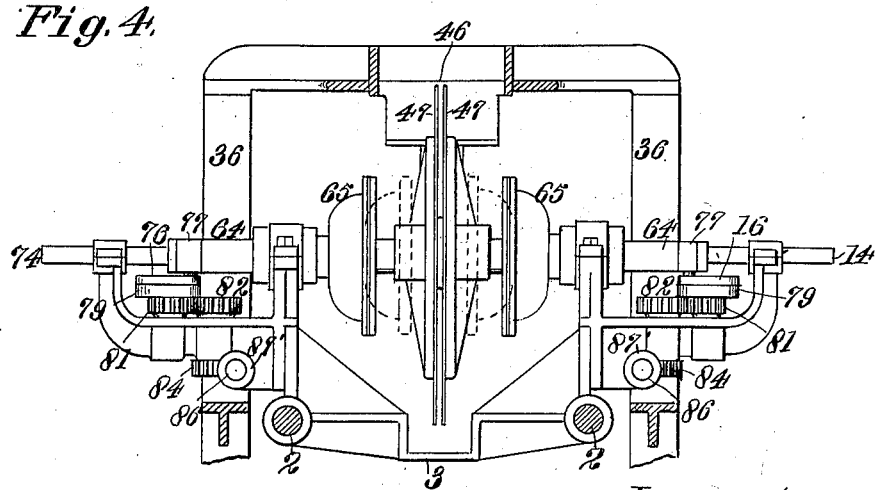
Fig. 4 is a transverse sectional view taken on line 4—4 of Fig. 1.
Figure 34:
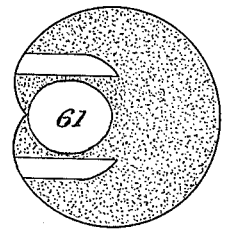
Fig. 34 is a vertical sectional view of a peach mounted on the impaling knives.
Figure 35:
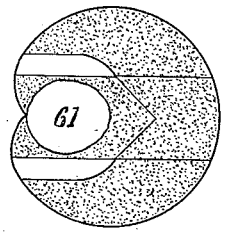
Fig. 35 is the same view of the same peach after the impaling knives have positioned the same within one of the slots of the transfer member, the lines indicating the cuts formed by the edges of the transfer member.
Figure 36:
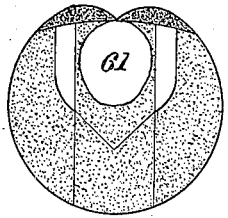
Fig. 36 is a similar view of the fruit during the cycle of its operation, the darkened area indicating the first portion of the slice removed in the formation of the annular groove.

In longitudinal alignment with the impaling devices 7 the shaft 37 mounts a turret or transfer member 46 consisting of the parallel spaced relatively thin sheets or disks 47 circular in elevation and said disks at points in register with each other are provided with radial slots 48 formed with converging inner end walls 49, Figs. 1, 4 and 5 of the drawings. The disks 47, Fig. 4, are spaced from each other a distance corresponding to the width of the impaling devices at their bases, Figs. 10 and 12 and the spacing of the disks controls the width of the slice to be cut from the fruit. The distance between the parallel walls 48 of the recesses in each disk is slightly greater than the maximum area of a peach pit at its point of greatest thickness.

Having described the table and impaling devices together with the turret or transfer member, the operation of the device up to this point will be set forth. With the parts as illustrated in Fig. 1 and the shaft 26 rotating in the direction of the arrow 50, the operator positions the stem depression of a peach over the centering pin 12, Fig. 8, and with the crease C of the peach in parallel alignment with the impaling devices. The operator then moves the peach in the direction of the arrow B causing the body 11 to slide between the friction balls 14 and the peach to become impaled on the members 7 as indicated in Fig. 11. This operation causes the impaling members 7 to make a cut in the pulp at opposite sides of the pit from a point beginning at the stem end of the fruit to a point slightly beyond the pointed edge of the pit. The movement of the bed 3 causes the fruit to be conveyed toward the disks 47 and when one of the slots 48 therein is in alignment with the impaling devices carrying the fruit to be sliced and pitted, the cam 28 operates the bed to cause the fruit carried by the impaling devices to be impaled on the disks 47 of the turret, with the pit received within the recess 48. The impaling members 7 are now withdrawn due to the retracting movement of the bed 3, leaving the fruit impaled on the turret or transfer member on the lines indicated by the letter D, Fig. 15 of the drawings.

To assist in completing a cut to be made annularly of the peach and particularly at that portion of the peach commonly termed the stem end, I mount at the forward upper end of the raised frame portion 35 a pair of parallel spaced knives 50' disposed with their cutting edges slightly above and one parallel with each of the disks 47, Fig. 5 of the drawings. At a point above the shaft 37 I interpose between said knives 50' an upwardly inclined directing member 51, Figs. 5 and 15, for directing that portion of the slice cut from the fruit upwardly away from the apparatus. The upward movement of the transfer member will carry the peach to the position indicated in Fig. 5, in which position the operation set forth in Figs. 15 and 36 takes place. As previously explained, the positioning of the peach on the disks 47 cause a slice cut to be made therein inwardly from the blossom end of the fruit, but up to the present time this cut slice has not been released from the fruit and is held thereto by a portion of the pulp near the blossom end of the pit.

At a point diametrically opposite the point of reception of the peaches on the disks 47, there is extended upwardly between the disks a knife 52, its lower end supported on a bracket 53 and its upper end curved on a radius 54 corresponding to that of the disks 47 and with its extreme terminus fashioned in a point 55, the knife being of a width corresponding to the distance between the inner faces of the disks 47. In operation the knife, Figs. 5, 16 and 37 of the drawings, is on the movement of the fruit by the transfer member caused to pass through the fruit in an arcuate path in a plane parallel with the cuts formed by the edges 48 and severs from the blossom end of the fruit a portion as indicated in Figs. 16 and 37, this portion 56 releasing the opposite side portions 57 and 58 which were previously cut on parallel lines adjacent to the pit by the impaling devices, thus after the fruit has been acted on by the knife 52 an annular groove has been formed circumferentially of the pit to a depth nearly to the surface of the pit, the only material remaining being that indicated by the numeral 59 in the base of the annular groove 60 closely surrounding the pit 61, Figs. 37, 38 and 40. The material 56 cut by the knife 52 is removed from between the disks 47 by a deflector blade 61, Fig. 5 of the drawings.

When the fruit has been operated on by the knife 52 and has arrived at a position diametrically opposite to the point of its reception on the transfer member, it is removed from the transfer member and carried by a conveying means during the remainder of the operations of the apparatus.

At the opposite end of the bed 3 from the member 5 are carried the lateral arms 62 upwardly extended at their opposite ends and each extension being provided with a bearing opening 63, the bearing openings of each pair being in alignment and the bearing openings of oppositely disposed arms in turn being in alignment. Mounted in bushings, Figs. 4, 17, 18 and 19 in the openings in the innermost arms of the opposing pairs are the tubular supporting members 64 carrying at their outer ends cupped heads 65. The periphery of each head is flanged as at 66 and resting on said flange is an elastic disk 67 closing the open mouth of the cup, the disk being held in position by a ring 68 secured to the flange 66 by screws or other fastening means 69, Fig. 20 of the drawing. Associated with the outer face of each elastic disk 67 and held within the mouth of the cup by the ring 68 is a flat coiled spring engaging member 70 each at its center connecting with a cupped member 71 rearwardly from which extends a stem 72 mounting a valve 73 thereon which is adapted to normally rest on seat 74. From the inner end of each supporting member 64 extends a tubular guide 74' connecting with a pressure pump, not shown, for supplying air to the cups. On the movement of the cups to engage a fruit as in Fig. 19, by a mechanism hereinafter described, the configuration of the fruit and its reception within the cups causes an unseating of the valves 73 admitting air pressure to enter the cup ends 65 and said air pressure acts on the elastic disks 67 to force their respective springs 70 about the fruit to firmly engage the same at diametrically opposite sides without marring it in any manner. The cups 65 are simultaneously reciprocated to and from each other by any suitable mechanism, that illustrated as associated with each cup consisting of a link 76 pivotally connected at one end through a collar 77 with the member 64 and at its opposite end through a pin 78 with one end of a crank 79. The crank extends laterally from one end of a stud 80 rotatably mounted in a bearing in its associated arm 62 and mounting a pinion gear 81 intermeshing with another gear 82 on the upper end of a shaft 83 in a bearing opening in the arm 62. The shaft 83 on its lower end carries a pinion 84 intermeshing with a rack 85 on a reciprocably mounted shaft 86 disposed parallel to the member 2. The respective shafts 86 are of a length to extend beyond the ends of their tubular bearings 87' for the hereinafter described purpose.

As in Fig. 1 of the drawings, the conveying members consisting of the cups 65 lie on opposite sides of a fruit after the same has had an annular slice removed therefrom approximately to the depth of the pit, and on the arrival of the conveying members to their forwardmost point on the main frame 1 the forward ends of the rods 86 engage the stationary adjustable stops 88 at a point in rear of the shaft 39 and through the gear and link arrangement the cups 65 are moved toward each other to engage the annularly grooved fruit, in a manner illustrated in Fig. 19, and which fruit is still retained in a receiving recess in the transfer member at a point diametrically opposite from its point of reception. On the next rearward movement of the bed 3 the fruit held between the conveying members, the rings 68 of which lie in spaced relation as in Fig. 19, is passed through a scraping mechanism adapted to scrape the portion of the pulp adhering to the pit at the base of the groove from the pit to present a clean pit surface at the base of the groove, and this scraping mechanism is preferably constructed as follows. The scraping mechanism consists of a pair of opposing knives 89, each knife consisting of two blades 90 in parallel relation, the knives of each pair being secured to a back 91 retained in a flanged guide 92, the flange 93 of which rests on the surface 94, Fig. 6. The curvature of the back 91 and guide 92 is such as to permit the movement of the opposite ends of the blades 90 of the pair to and from each other on the passage of a peach pit therebetween. The forward edges of the blades 90 of the pair are adapted to normally lie in spaced relation from each other as at 95, Fig. 5 of the drawings and at their rear ends to substantially contact as at 96, springs 97 exerting rearward pressure on lateral extensions 98 maintaining the rear ends of the blades in contact. The parallel blades 90 of each pair are at their rear ends united by a transverse expelling or scraping member 99 curved in such manner as to direct the material removed thereby towards the backs of the respective blades 90. The fruit engaged by the conveying members or cups 65 is removed from their respective recesses in the transfer member and is carried in a horizontal path between the cutting edges of blades 90 of the opposite pairs of knives. These knives cut the pulp in the same plane as the sides of the walls of the annular groove to the depth of the pit surface and as the stem end of the pit contacts with the inclined surfaces 100 of the blades the knives are oscillated in their bearings, see dotted lines Fig. 5, and the continued movement of the fruit therebetween causes the members 99 to scrape the adhering pulp from the pit as the pit passes therebetween, the edges of the scrapers 99 being held to the surface of the pit by the tension of the springs 97.

Thus when the fruit has been conveyed between the pair of knives 89 the pulp has been removed in an annular groove from the outside of the fruit to the depth of the pit as in Fig. 39.

The conveying members in their movement next present an annularly grooved fruit to the mechanism for removing the pit from the fruit and in so doing to separate the fruit into two half sections and the mechanism for removing the pit, which lies immediately in rear of the knives 89, is constructed in the following manner, Figs. 1 and 22 to 33 inclusive. At the rear of the frame 1 is a pair of upwardly extending supports 101 which slidably mount a substantially rectangular frame 102 provided with a central recess 103, in which recess is rotatably mounted an elongated pinion 104. The pinion is provided with a tubular bore 105 extending longitudinally therethrough and through said bore extends a pitting knife operating shaft 106, the shaft at its opposite ends extending beyond the ends of the frame 102. The pinion 104 imparts rotation to the shaft 106 through a key 107 extending into a longitudinal groove 108 in the shaft 106, this key and groove construction permitting relative longitudinal movement between the pinion and shaft. From the forward end of the frame 102 extends a tubular support 109 on the outer end of which are pivotally mounted cooperating jaw members 110. The jaw members on their inner surfaces are formed with arcuate depressions 111 providing between said jaw members a recess corresponding substantially to the contour of a peach pit. The jaw members are of a width to be received within the annular groove 60 formed within the peach by the removal of the slice therefrom, and at their outer ends are provided with engaging surfaces 112. Links 113 connect the respective jaw members 110 substantially midway of their length with the fixed rails 114 of the upstanding frame 35. Within each depression 111 in the respective jaws 110 is mounted a pitting knife 115, each knife in side elevation conforming substantially to the configuration of the depression and each knife is substantially triangular in cross section providing opposing cutting edges 116. The forward ends of the respective knives 115 carry cooperating studs counterparts of each other, which co-act to form when in engagement a cylindrical shaft one-half of which is normally receivable in a semi-circular depression 117 in the outer end of each jaw 110. The respective studs are retained in their respective depressions and rotatably mounted therein by end plates 118, one associated with the free end of each jaw and each end plate is provided with a projection on its end cooperating to form between them a conical extension 119 split on the longitudinal axis of rotation of the knife bearings and this conical extension is received in a corresponding depression 120 in the ends of the respective bearing extensions for the free ends of the knives 115. The inner ends of the knives 115 are hinged as at 121' to a bearing 122 rotatably mounted in the outer end of the tubular extension 109, and which bearing is connected with the knife operating shaft 106. A cross head 123 is disposed transversely of the frame 102 and at its ends carries adjustable stops 124 with which are adapted to contact the journal boxes 125 mounting the cups 65 during the rearward movement of the bed 3. Coiled springs 126 are connected at one end with fixed arms 127 and at their rear ends with a cross head 128 carried by the frame 102 to oppose the rearward movement of the frame 102 during the rearward movement of the bed 3 and have a tendency to normally reciprocate the frame 102 toward the feed end of the apparatus. To permit of slight longitudinal movement of the shaft 106 within the pinion 104 and to compensate for any play during the opening and closing movement of the jaws 110, springs 129 are employed to exert an outward pressure through a movable plate 130 on the head 121 at the rear end of the shaft 106. To impart oscillating movement to the knives 115 circumferentially of the peach pit to free the remaining portions of the half sections at opposite sides of the groove from the pit and to return the knives to their normal position after such cutting operation, the pinion 104 is engaged by a toothed segment 132 operating on a shaft carried by the arms 101 and disposed parallel with the axis of rotation of the pinion 104 and said shaft in turn carries a pinion 133 with which engages a toothed rack 134 mounted to reciprocate in a bearing 135 in one of the members 101. The rack 134 is carried at the upper end of a rod 136 which mounts at its lower end a plate 137 vertically slotted as at 138 to receive the shaft 26, said shaft affording a guide for the plate in its reciprocating movement. A cam roller 139 is carried at the upper end of the plate 137 and the same cooperates with a cam 140 mounted on the shaft 26 designed to impart a reciprocating movement to the rod 136 and to permit an idle movement thereof during approximately one-half of the cycle of rotation of the shaft 26.

After the fruit has been conveyed from the rear ends of the knives 89 by the cupped members 65 the pit 61 of the fruit is carried between the normally open jaws 110 with the jaw members received in opposite sides of the annular groove 60. A continued rearward movement of the pit 61 causes the rear ends of journals 125 to engage the adjustable stops 124, which causes a rearward movement of the frame 102 with the movable bed 3. This action due to the links 113 causes a closing of the jaws 110 about the pit until the forward ends of the jaws are in meeting relation, at which time the cam 140 commences an operative movement of the shaft 136, which through the train of gears causes an axial rotation of the pinion 104, it in turn axially rotating shaft 106, which causes the knives 115 to cut opposite halves of the fruit from the pit as indicated in Fig. 28. Each knife in its cutting operation travels one-half of the circumference of the pit in severing the half sections of the fruit from the pit and on the peak 141 of the cam passing beneath the idler 139 the weight of the shaft 136 and its associated parts causes the knives 115 to return to their normal position one within each depression 111 of the respective jaws 110. At this time the rear end of the respective racks 86 are in contact with the adjustable cup operating stops 142, Fig. 1 of the drawings, causing a separating movement to be imparted to the respective cups 65, which permits of the releasing of the fruit half sections therefrom, the half sections dropping by gravity into a suitable receptacle not shown, and the cycle of operation of the bed 3 at this point is such as to return the bed to its forward position with the cups separated and adapted to engage another fruit on their being forced together by the forward end of the rack bar 86 contacting with the forward adjustable cup operating stop 143, Fig. 1 of the drawings. Immediately on the commencement of the forward movement of the bed 3 springs 126 impart a forward movement to the frame 102, which action through links 113 causes an opening or separation of the free ends of the jaws 110, permitting the severed peach pit to be released from between jaws 110.

Having thus described my invention, what I claim as new and desire to secure by Letters Patent of the United States is:—

1. A peach pitting and halving apparatus including means for cutting and removing an annular slice circumferentially from the peach to the depth of the pit, to form the pulp into halves each adhering to a portion of the pit, and means receivable in the annular groove formed by the removal of the slice and movable circumferentially of the pit at right angles to the groove for severing the adhering portions of the pulp from the pit.

2. A peach pitting and halving apparatus including means for forming a groove circumferentially of a peach to the depth of the pit to divide the pulp into sections each adhering to the pit, and a knife receivable in said groove and movable axially about the pit for severing the adhering portions of the sections from the pit.

3. A peach halving and pitting apparatus including devices for cutting a peach circumferentially in parallel planes to the depth of the pit and for removing the cut portion from the peach to form a groove circumferentially of the same and to form the pulp into sections each adhering to the pit, and means receivable within the groove for embracing the pit and movable at right angles to the groove about the pit to separate the adhering portions of the sections from the pit.

4. A peach halving and pitting apparatus including means for cutting a peach annularly to separate the same into halves, with a portion of each adhering to the pit, means for separating the adhering portions of the halves from the pit, and means for presenting the peach to the cutting means in a predetermined position.

5. A peach halving and pitting apparatus including means for cutting a peach annularly to separate the same into halves, with a portion of each adhering to the pit, means for separating adhering portions of the halves from the pit, and peach feeding means including means for centering the peach on the feeding means.

6. A peach halving and pitting apparatus including means for cutting a peach annularly to separate the same into halves, with a portion of each adhering to the pit, means for separating the adhering portions of the halves from the pit, peach feeding means including a pair of peach impaling knives, and means for guiding the peach onto said knives.

7. A peach halving and pitting apparatus including means for cutting a peach annularly to separate the same into halves, with a portion of each adhering to the pit, means for separating the adhering portions of the halves from the pit, peach feeding means including a pair of peach impaling knives, and means for reception within the stem depression of the peach for guiding the same onto the knives.

8. A peach halving and pitting apparatus including means for cutting a peach annularly to separate the same into halves, with a portion of each adhering to the pit, means for separating the adhering portions of the halves from the pit, peach feeding means including a pair of peach impaling knives, and means movable relative to the knives for reception within the stem depression of the peach for guiding the same onto the knives.

9. A peach halving and pitting apparatus including means for cutting a peach annularly to separate the same into halves, with a portion of each adhering to the pit, means for separating the halves from the pit, peach feeding means including impaling devices and a centering member one movable relatively to the other, the centering member adapted for projection in advance of the impaling devices for reception within the depression at the stem end of the peach for guiding the peach onto the impaling devices.

10. A fruit halving and pitting apparatus including movable means for receiving and arcuately cutting a peach in parallel planes inwardly from its surface to the depth of the pit, devices for completing the circumferential cut of the peach in the same planes and for removing a slice to the depth of the pit between said cuts to provide a groove circumferentially of the peach and form half portions each adhering to the pit, means receivable in the groove and movable circumferentially of the pit for severing the adhering portions of the half sections from the pit, and conveying members for engaging the fruit and for conveying the same from the movable cutting means to the pit removing means.

11. A fruit halving and pitting apparatus including movable means for receiving and arcuately cutting a peach in parallel planes inwardly from its surface to the depth of the pit, devices for completing the circumferential cut of the peach in the same planes and for removing a slice to the depth of the pit between said cuts to provide a groove circumferentially of the fruit and form half sections each adhering to the pit, means receivable in the groove and adapted for yieldably engaging the pit to remove the pulp adhering thereto, means receivable in the groove and movable circumferentially of the pit for severing the adhering portions of the halves therefrom, and members for engaging the fruit on opposite sides of the groove and for conveying the same from the movable cutting means through the apparatus.

12. A peach halving and pitting apparatus, including means for cutting an annular slice from a peach to the depth of the pit, means receivable in the depression formed by the removal of the slice and movable circumferentially of the pit at right angles to the walls of the depression to separate the adhering portions of the pit from the halves, and means in the form of opposing cooperating cupped members engaging the fruit and conveying the same through the apparatus.

13. A peach halving and pitting apparatus including means for halving and pitting a peach, peach conveying means comprising opposing co-operating cupped members, elastic engaging surfaces associated with the cupped members, means for moving the cupped members to and from each other into and from peach engaging and releasing position, and means for exerting a fluid pressure on said elastic surfaces to cause the same to conform to the contour of a portion of the peach engaged thereby.

14. A peach halving and pitting apparatus including means for halving and pitting a peach, peach conveying means comprising opposing co-operating cupped members, elastic engaging surfaces associated with the cupped members, means for moving the cupped members to and from each other into and from peach engaging and releasing position, and means for exerting a fluid pressure on said elastic surfaces to cause the same to conform to the contour of a portion of the peach engaged thereby, and a fluid pressure controlling valve automatically opened on the engagement of the fruit between said members.

15. A peach halving and pitting apparatus including means for halving and pitting a peach, peach conveying means comprising opposing co-operating cupped members, means for moving the cupped members to and from each other, an elastic surface over the mouth of each cupped member for closing the same, means for exerting a fluid pressure within each cup for causing the elastic surfaces to conform to the contour of a portion of the fruit engaged thereby, and means for moving said cups in unison at right angles to their movement relative to each other.

16. A peach halving and pitting apparatus including means for halving and pitting a peach, peach engaging means comprising a pair of co-operating cupped members movable on a common axis to and from each other into peach engaging and releasing position, a movable bed mounting said cupped members, means for reciprocating the bed, and devices coacting with the cupped members for imparting relative movement thereto during the reciprocation of the bed in opposite directions.

17. A peach halving and pitting apparatus including means for halving and pitting a peach, said means including a pair of oscillatory knives, each consisting of a pair of parallel blades, the co-operating blades of opposing knives being disposed in parallel planes with the forward portion of the cutting edges normally lying in spaced relation providing a normally open pit receiving recess, the rearward portion of said cutting edges converging toward each other, scraping means disposed transversely across the rear portions of the cutting edges of the respective pairs of blades, yieldable means for normally maintaining the forward portions of the knives separated, and means for conveying a fruit therebetween to cause a slice of pulp to be removed to the depth of the pit.

In testimony whereof I have signed my name to this specification.

ARTHUR L. DUNCAN.